(12) United States Patent
Kitamura

(10) Patent No.: US 11,420,590 B2
(45) Date of Patent: Aug. 23, 2022

(54) VEHICULAR REMOVABLE BATTERY AND ANTITHEFT SYSTEM FOR VEHICULAR REMOVABLE BATTERY

(71) Applicant: HONDA MOTOR CO., LTD., Tokyo (JP)

(72) Inventor: Toru Kitamura, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 85 days.

(21) Appl. No.: 16/942,797

(22) Filed: Jul. 30, 2020

(65) Prior Publication Data

US 2021/0039595 A1  Feb. 11, 2021

(30) Foreign Application Priority Data

Aug. 9, 2019  (JP) .............................. JP2019-147788

(51) Int. Cl.
*B60R 25/24* (2013.01)
*B60L 53/80* (2019.01)
*B60R 25/40* (2013.01)

(52) U.S. Cl.
CPC .............. *B60R 25/24* (2013.01); *B60L 53/80* (2019.02); *B60R 25/403* (2013.01)

(58) Field of Classification Search
CPC .. B60L 2240/80; B60L 2270/34; B60L 53/68; B60L 53/80; B60L 58/10;
(Continued)

(56) References Cited

U.S. PATENT DOCUMENTS

2011/0241824 A1\* 10/2011 Uesugi .................. B60L 53/305
340/5.8
2015/0166012 A1\* 6/2015 Simonazzi .............. B60L 53/64
180/167

(Continued)

FOREIGN PATENT DOCUMENTS

JP  2002-193074  7/2002
JP  2003-132954  5/2003

(Continued)

OTHER PUBLICATIONS

Japanese Office Action for Japanese Patent Application No. 2019-147788 dated May 10, 2022.

*Primary Examiner* — Omer S Khan
(74) *Attorney, Agent, or Firm* — Amin, Turocy & Watson, LLP

(57) ABSTRACT

A vehicular removable battery removably mountable in an electric vehicle includes a time acquirer configured to acquire a current time, a time period storage storing a time period in which electric power is supplied, and an electric power supply controller configured to control the supply of the electric power stored in an electric power storage to the electric vehicle. After the electric power supply controller detects that an activation instruction of the electric vehicle has been issued, the electric power supply controller is configured to enable the supply of the stored electric power to the electric vehicle in a case where the acquired current time is included in the stored time period. The electric power supply controller is configured to prohibit the supply of the electric power to the electric vehicle in a case where the acquired current time is not included in the stored time period.

6 Claims, 7 Drawing Sheets

(58) Field of Classification Search
CPC .. B60R 25/24; B60R 25/403; H01M 2220/20; H01M 50/576
See application file for complete search history.

(56) References Cited

U.S. PATENT DOCUMENTS

2017/0062877 A1* 3/2017 Fukumoto ........ G05B 19/40938
2021/0316633 A1* 10/2021 Kalligeros .............. B60L 53/65

FOREIGN PATENT DOCUMENTS

| | | |
|---|---|---|
| JP | 2003-206554 | 7/2003 |
| JP | 2007-030863 | 2/2007 |
| JP | 2012-106631 | 6/2012 |
| JP | 2012-128548 | 7/2012 |
| JP | 2013-051809 | 3/2013 |
| JP | 2015-519252 | 7/2015 |
| JP | 2017-046568 | 3/2017 |
| JP | 2017-144777 | 8/2017 |
| JP | 2018-203168 | 12/2018 |
| WO | 2013/179208 | 12/2013 |

* cited by examiner

VEHICULAR REMOVABLE BATTERY AND ANTITHEFT SYSTEM FOR VEHICULAR REMOVABLE BATTERY

CROSS-REFERENCE TO RELATED APPLICATION

Priority is claimed on Japanese Patent Application No. 2019-147788, filed Aug. 9, 2019, the content of which is incorporated herein by reference.

BACKGROUND

Field of the Invention

The present invention relates to a vehicular removable battery and an antitheft system for the vehicular removable battery.

Description of Related Art

In recent years, development of electric vehicles such as a battery electric vehicle (BEV) and a hybrid electric vehicle (HEV), each of which performs traveling using an electric motor driven with electric power supplied from a battery (a secondary battery), has progressed. In addition, some recent electric vehicles adopt a battery configured to be removable (hereinafter referred to as a "removable battery"). An electric vehicle in which a removable battery is adopted can travel continuously, for example, by replacing a removable battery with another removable battery storing sufficient electric power such as a spare removable battery that has been fully charged when the electric power of the removable battery currently mounted in the electric vehicle is exhausted. For this reason, there is a problem in that a removable battery may be stolen from an electric vehicle in which the removable battery is adopted in addition to the vehicle.

Conventionally, technologies related to an antitheft device have been disclosed (see, for example, Japanese Unexamined Patent Application, First Publication No. 2007-030863, Japanese Unexamined Patent Application, First Publication No. 2002-193074, or Japanese Unexamined Patent Application, First Publication No. 2003-132954).

However, the technology of Japanese Unexamined Patent Application, First Publication No. 2007-030863 does not prevent the theft of a battery. The technologies disclosed in Japanese Unexamined Patent Application, First Publication No. 2002-193074 and Japanese Unexamined Patent Application, First Publication No. 2003-132954 provide an antitheft device built into a battery mounted and installed in a vehicle. Thus, the prevention of theft of a portable battery, which is assumed to be used for replacement, such as a removable battery for use in an electric vehicle has not been sufficiently studied.

SUMMARY

The present invention has been made on the basis of recognition of the above-described problems and an objective of the present invention is to provide a vehicular removable battery and an antitheft system for the vehicular removable battery capable of reducing the possibility of theft.

A vehicular removable battery and an antitheft system for the vehicular removable battery according to the present invention adopt the following configurations.

(1): According to an aspect of the present invention, there is provided a vehicular removable battery removably mountable in an electric vehicle, the vehicular removable battery including: a time acquirer configured to acquire a current time; a time period storage storing a time period in which electric power is supplied; and an electric power supply controller configured to control the supply of the electric power stored in an electric power storage to the electric vehicle, wherein, after the electric power supply controller detects that an activation instruction of the electric vehicle has been issued, the electric power supply controller is configured to enable the supply of the stored electric power to the electric vehicle in a case where the acquired current time is included in the stored time period, and the electric power supply controller is configured to prohibit the supply of the electric power to the electric vehicle in a case where the acquired current time is not included in the stored time period.

(2): In the above-described aspect (1), after it is detected that the activation instruction of the electric vehicle has been issued, the electric power supply controller is configured to acquire a first dedicated code transmitted by a battery management server that manages use of the vehicular removable battery in the electric vehicle, acquire a second dedicated code input by a user of the electric vehicle from an input device, and is configured to enable the supply of the electric power to the electric vehicle in a case where the acquired first dedicated code matches the acquired second dedicated code.

(3): In the above-described aspect (2), the electric power supply controller is configured to acquire the first dedicated code via a communication device provided in the electric vehicle.

(4): In the above-described aspect (2), the electric power supply controller is configured to update the time period stored in the time period storage by setting a time period from an electric power supply start time to an electric power supply end time acquired on the basis of an operation state of the electric vehicle as a new time period.

(5): In the above-described aspect (4), the electric power supply controller is configured to set the acquired current time when it is detected that the activation instruction of the electric vehicle has been issued as the electric power supply start time and set the acquired current time when it is detected that an operation end instruction of the electric vehicle has been issued as the electric power supply end time.

(6): In the above-described aspect (2), the input device is a device mounted in the electric vehicle, and the electric power supply controller is configured to update the time period stored in the time period storage by setting a time period input by the user of the electric vehicle as a new time period.

(7): According to an aspect of the present invention, there is provided an antitheft system for a vehicular removable battery, the antitheft system including: the vehicular removable battery according to the above-described aspect (1); and a battery management server configured to manage the use of the vehicular removable battery in the electric vehicle, wherein the battery management server is configured to create a dedicated code for using the vehicular removable battery in the electric vehicle on the basis of a use request, a use start time, and a use end time of the vehicular removable battery transmitted by a terminal device of a user of the electric vehicle and transmit the created dedicated code as a second dedicated code to the terminal device, wherein the battery management server is configured to transmit the created dedicated code as a first dedicated code to the vehicular removable battery in response to a request from the vehicular removable battery mounted in the electric vehicle, and wherein the vehicular removable battery is configured to enable the supply of the electric power stored in the electric power storage to the electric vehicle in a case where the first dedicated code transmitted by the battery management server matches a code input from an input device by the user and prohibit the supply of the electric power to the electric vehicle in a case where the first dedicated code does not match the input code.

According to the above-described aspects (1) to (7), it is possible to reduce the possibility of theft.

DETAILED DESCRIPTION OF THE INVENTION

Embodiments of a vehicular removable battery and an antitheft system for the vehicular removable battery according to the present invention will be described below with reference to the drawings.

[Configuration of Vehicle Equipped with Vehicular Removable Battery]

Figure 1:
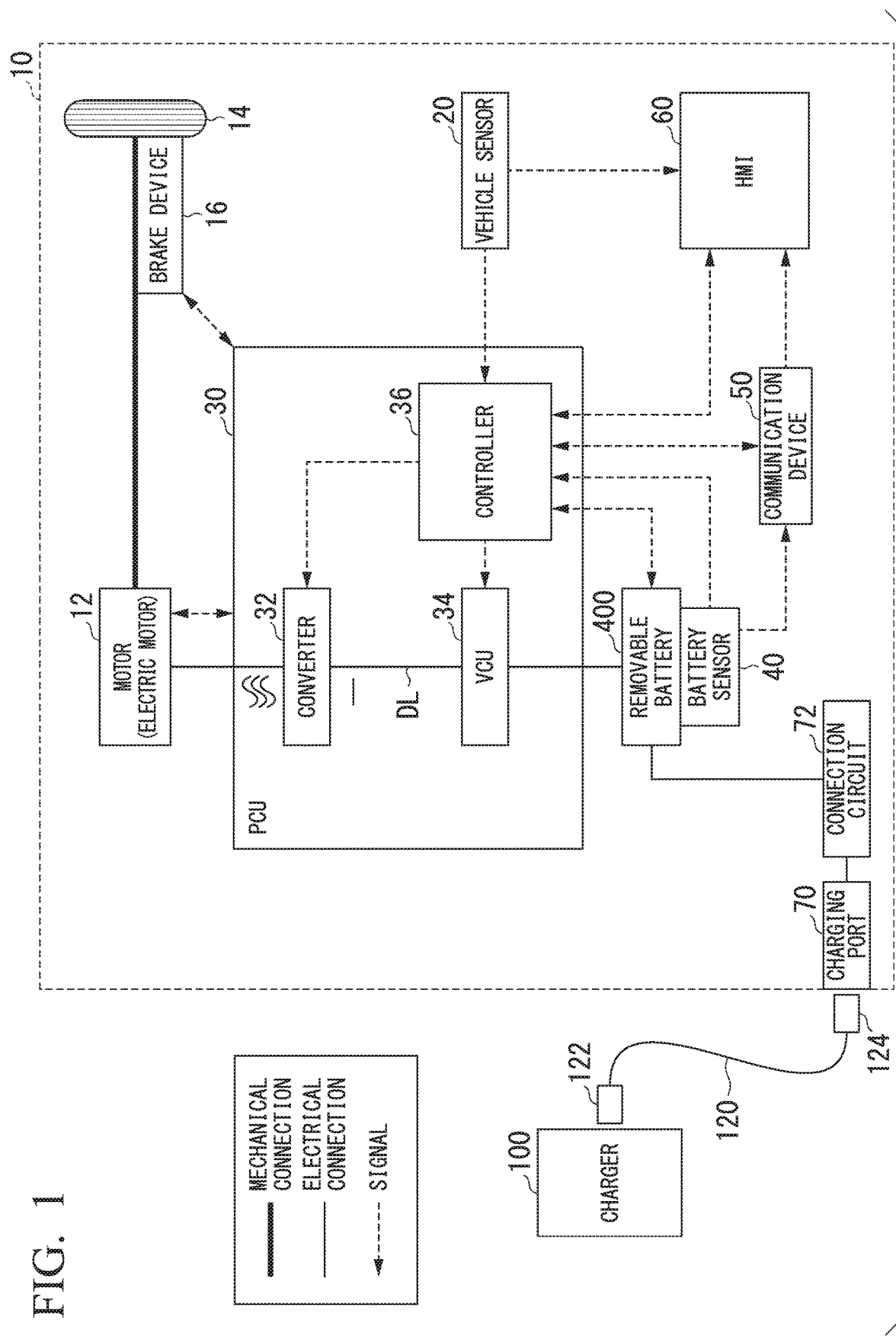
FIG. 1 is a diagram showing an example of a configuration of an electric vehicle in which a vehicular removable battery according to an embodiment is mounted.

FIG. 1 is a diagram showing an example of a configuration of an electric vehicle 10 equipped with a vehicular removable battery 400 according to an embodiment. In FIG. 1, the configuration of the electric vehicle 10 equipped with the vehicular removable battery 400 (hereinafter simply referred to as a "removable battery 400") is shown. The electric vehicle 10 is a vehicle that performs traveling using an electric motor driven with electric power supplied from the removable battery 400. For example, the electric vehicle 10 includes all electric vehicles, each of which performs traveling using an electric motor driven with electric power supplied from the removable battery 400, such as a saddle-type two-wheeled vehicle, a three-wheeled vehicle (including a two front-wheeled and one rear-wheeled vehicle in addition to a one front-wheeled and two rear-wheeled vehicle), and an assisted bicycle as well as a four-wheeled vehicle.

The electric vehicle 10 shown in FIG. 1 includes, for example, a motor 12, drive wheels 14, a brake device 16, a vehicle sensor 20, a power control unit (PCU) 30, a battery sensor 40 such as a voltage sensor, a current sensor, or a temperature sensor, a communication device 50, a human machine interface (HMI) 60 including a display device, a charging port 70, and a connection circuit 72.

The motor 12 is, for example, a three-phase alternating current (AC) electric motor. A rotor of the motor 12 is connected to the drive wheels 14. The motor 12 is driven with electric power supplied from an electric power storage (not shown) provided in the removable battery 400 and causes rotating motive power to be transferred to the drive wheels 14. The motor 12 generates electric power using kinetic energy of the electric vehicle 10 when the electric vehicle 10 is decelerated.

The brake device 16 includes, for example, a brake caliper, a cylinder that transfers hydraulic pressure to the brake caliper, and an electric motor that generates hydraulic pressure in the cylinder. The brake device 16 may include a mechanism that transfers hydraulic pressure generated by a user (a driver) of the electric vehicle 10 operating a brake pedal (not shown) to the cylinder via a master cylinder as a backup. The brake device 16 is not limited to the above-described configuration and may be an electronically controlled hydraulic brake device that transfers the hydraulic pressure of the master cylinder to the cylinder.

The vehicle sensor 20 includes, for example, an accelerator opening sensor, a vehicle speed sensor, and a brake depression amount sensor. The accelerator opening sensor is attached to the accelerator pedal, detects an amount of operation of the accelerator pedal by the driver, and outputs the detected amount of operation as an accelerator opening to a controller 36 provided in the PCU 30 to be described below.

The vehicle speed sensor includes, for example, a wheel speed sensor and a speed calculator attached to each wheel of the electric vehicle 10 and combines wheel speeds detected by the wheel speed sensors to derive the speed of the electric vehicle 10 (a vehicle speed) and output the derived speed to the controller 36 and the HMI 60. The brake depression amount sensor is attached to the brake pedal, detects the amount of operation of the brake pedal by the driver, and outputs the detected amount of operation as the amount of brake depression to the controller 36.

The PCU 30 includes, for example, a converter 32, a voltage control unit (VCU) 34, and the controller 36. In FIG. 1, a configuration of these components integrated as the PCU 30 is only an example and these components may be disposed separately in the electric vehicle 10.

The converter 32 is, for example, an AC-direct current (DC) converter. A DC side terminal of the converter 32 is connected to a DC link DL. The removable battery 400 is connected to the DC link DL via the VCU 34. The converter 32 converts an AC current generated by the motor 12 into a DC current and outputs the DC current to the DC link DL.

The VCU 34 is, for example, a DC-DC converter. The VCU 34 boosts the electric power supplied from the removable battery 400 and outputs the boosted electric power to the DC link DL.

The controller 36 includes, for example, a motor controller, a brake controller, and a battery and VCU controller. The motor controller, the brake controller, and the battery and VCU controller may be replaced with separate control devices, for example, control devices such as a motor electronic control unit (ECU), a brake ECU, and a battery ECU.

The controller 36 controls the driving of the motor 12 on the basis of an output from the accelerator opening sensor provided in the vehicle sensor 20 in the motor controller. The controller 36 controls the brake device 16 on the basis of an output from the brake depression amount sensor provided in the vehicle sensor 20 in the brake controller. For example, the controller 36 calculates a state of charge (SOC) of the removable battery 400 on the basis of an output from the battery sensor 40 to be described below connected to the removable battery 400 in the battery and VCU controller and outputs the calculated SOC to the VCU 34 and the HMI 60. The controller 36 may output vehicle speed information output by the vehicle sensor 20 to the HMI 60. The VCU 34 causes a voltage of the DC link DL to be increased in accordance with an instruction from the battery and VCU controller.

The removable battery 400 is, for example, a cassette type battery pack or the like removably mounted in the electric vehicle 10. For example, the removable battery 400 includes a secondary battery such as a lithium-ion battery that can be iteratively charged and discharged. An example in which the secondary battery is a capacitor such as an electric double layer capacitor, a composite battery in which a secondary battery and a capacitor are combined, or the like in addition to a lead storage battery, a nickel-hydride battery, a sodium ion battery, or the like is conceivable. In the present invention, the configuration of the secondary battery provided in the removable battery 400 is not particularly specified. The secondary battery provided in the removable battery 400 stores electric power introduced from a charger 100 outside the electric vehicle 10 and discharges electric power for traveling of the electric vehicle 10. The secondary battery is an example of an "electric power storage" in the claims.

In addition to the electric power storage, the removable battery 400 includes a component for preventing the theft thereof or preventing the use thereof even if the removable battery 400 is stolen. The removable battery 400 executes a function of preventing the removable battery 400 from being stolen on the basis of information obtained by the controller 36 via the communication device 50 or the HMI 60 to be described below. Details of the configuration of the removable battery 400 will be described below.

The battery sensor 40 includes, for example, an electric current sensor, a voltage sensor, and a temperature sensor. The battery sensor 40 is connected to the removable battery 400 mounted in the electric vehicle 10. The battery sensor 40 detects an electric current of the secondary battery provided in the removable battery 400 using the electric current sensor, detects a voltage of the secondary battery using the voltage sensor, and detects a temperature of the secondary battery using the temperature sensor. The battery sensor 40 outputs information such as a value of the detected electric current, a value of the detected voltage, and the detected temperature of the secondary battery to the controller 36 or the communication device 50.

The communication device 50 includes a wireless module for connecting to a cellular network or a Wi-Fi (registered trademark) network. The communication device 50 may include a wireless module for using Bluetooth (registered trademark) or the like. The communication device 50 transmits and receives information for controlling an antitheft function of the removable battery 400 to and from the battery management server 300 to be described below through communication via a network (not shown) to be described below in the wireless module. Details of information transmitted and received by the communication device 50 to and from the battery management server 300 to be described below will be described below.

For example, the HMI 60 presents various types of information to the user of the electric vehicle 10 such as a driver and receives an input operation by the user. The HMI 60 is, for example, a so-called touch panel in which a display device such as a liquid crystal display (LCD) and an input device that detects an input operation are combined. The HMI 60 may include various types of display units other than the display device, a speaker, a buzzer, a switch other than the input device, a key, and the like. The HMI 60 displays information about an antitheft function of the removable battery 400 on the display device to present the information and receives information for controlling the antitheft function of the removable battery 400 input to the input device. The HMI 60 may be configured to include an imaging device such as a camera as the input device and acquire information for controlling the antitheft function of the removable battery 400 from an image captured by the camera. The camera is, for example, a digital camera using a solid-state image sensor such as a charge coupled device (CCD) or a complementary metal oxide semiconductor (CMOS). Details of the information presented and received by the HMI 60 will be described below.

The charging port 70 is a mechanism for charging the connected secondary battery in a state in which the removable battery 400 is mounted in the electric vehicle 10. The charging port 70 is provided toward the outside of a vehicle body of the electric vehicle 10. The charging port 70 is connected to the charger 100 via a charging cable 120. The charging cable 120 includes a first plug 122 and a second plug 124. The first plug 122 is connected to the charger 100 and the second plug 124 is connected to the charging port 70. Electricity supplied from the charger 100 is input (supplied) to the charging port 70 via the charging cable 120.

The charging cable 120 includes a signal cable attached to an electric power cable. The signal cable mediates communication between the electric vehicle 10 and the charger 100. Therefore, an electric power connector for connecting the electric power cable and a signal connector for connecting the signal cable are provided in each of the first plug 122 and the second plug 124.

The connection circuit 72 is provided between the charging port 70 and the secondary battery provided in the removable battery 400. The connection circuit 72 transfers an electric current introduced from the charger 100 via the charging port 70, for example, a DC current, as an electric current to be supplied to the removable battery 400. The connection circuit 72 outputs, for example, a DC current to a secondary battery provided in the removable battery 400 and causes the secondary battery to store electric power (to be charged therewith).

[Configuration of Antitheft System]

Figure 2:
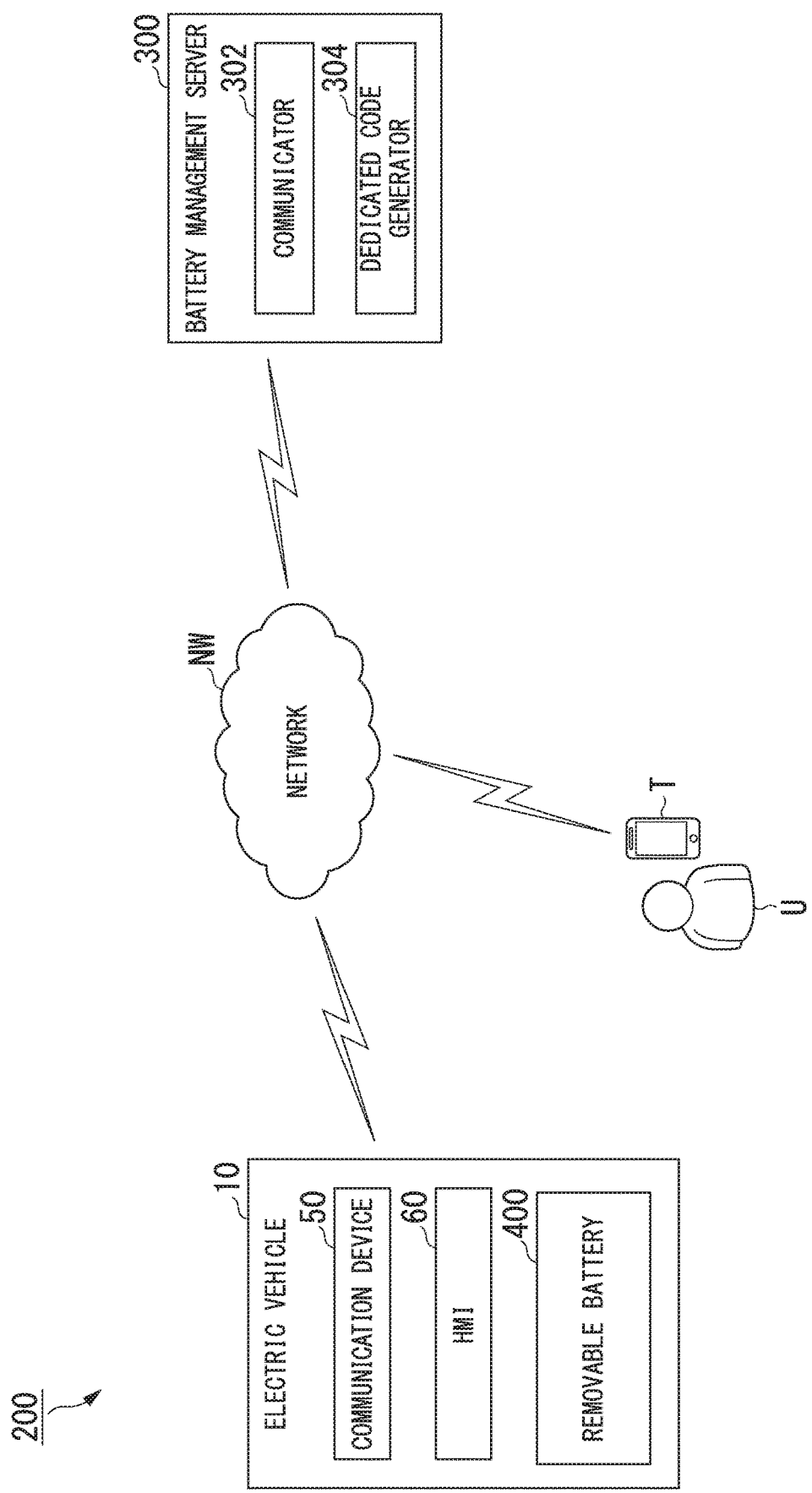
FIG. 2 is a diagram showing an example of a configuration of an antitheft system for the vehicular removable battery including the electric vehicle in which the vehicular removable battery according to the embodiment is mounted.

Next, an example of an antitheft system including the electric vehicle 10 in which the removable battery 400 is mounted will be described. FIG. 2 is a diagram showing an example of a configuration of an antitheft system 200 for the vehicular removable battery 400 including the electric vehicle 10 in which the vehicular removable battery 400 according to the embodiment is mounted. The antitheft system 200 shown in FIG. 2 includes, for example, the electric vehicle 10 in which the removable battery 400 is mounted, the battery management server 300, and the user terminal T. Also, the communication device 50 and the HMI 60 related to the antitheft system 200 and the removable battery 400 mounted in the electric vehicle 10 among the components provided in the electric vehicle 10 described above are shown in FIG. 2.

In the antitheft system 200, the battery management server 300, the user terminal T, and the communication device 50 provided in the electric vehicle 10 are connected via the network NW. The network NW is, for example, a communication network for wireless communication including the Internet, a wide area network (WAN), a local area network (LAN), a provider device, a radio base station, and the like.

The antitheft system 200 is a system for preventing the theft of the removable battery 400 or preventing the theft of the removable battery 400 from being carried out. The antitheft system 200 prevents the removable battery 400 from supplying electric power except for during a set time period by setting the time period in which the electric power stored in the electric power storage (the secondary battery) provided in the removable battery 400 is supplied to the electric vehicle 10. In other words, the antitheft system 200 can prevent the removable battery 400 from being used except for during the set time period.

The user terminal T is, for example, a terminal device such as a smartphone or a tablet terminal owned by a user (hereinafter referred to as a user U) of the electric vehicle 10 such as a driver. The user terminal T may be, for example, a stationary terminal device used by the user U. The user U issues a use request for the removable battery 400 to the battery management server 300 by operating an application for requesting the use of the removable battery 400 (hereinafter referred to as a battery use application) executed by the user terminal T or the like. The user terminal T transmits information about the use request for the removable battery 400 issued by the user U operating the battery use application to the battery management server 300 via the network NW. The information about the use request for the removable battery 400 transmitted from the user terminal T to the battery management server 300 includes information of the time when the use of the removable battery 400 will start (hereinafter referred to as a use start time) and the time when the use of the removable battery 400 will end (hereinafter referred to as a use end time).

The battery management server 300 manages the use of the removable battery 400 in the electric vehicle 10. The battery management server 300 includes, for example, a communicator 302 and a dedicated code generator 304. Each of the communicator 302 and the dedicated code generator 304 is implemented by a hardware processor such as a central processing unit (CPU) executing a program (software). Some or all of these components may be implemented by hardware (a circuit unit including circuitry) such as a large-scale integration (LSI), an application specific integrated circuit (ASIC), a field-programmable gate array (FPGA), or a graphics processing unit (GPU) or may be implemented by software and hardware in cooperation. Some or all of functions of these components may be implemented by a dedicated LSI. The program may be pre-stored in a storage device (a storage device including a non-transitory storage medium) such as a hard disk drive (HDD) or a flash memory of the battery management server 300 or may be stored in a removable storage medium (a non-transitory storage medium) such as a DVD or a CD-ROM and installed in the HDD or the flash memory of the battery management server 300 when the storage medium is mounted on a drive device. The battery management server 300 may be implemented by a server device or a storage device incorporated in a cloud computing system. In this case, the function of the battery management server 300 may be implemented by a plurality of server devices or storage devices in the cloud computing system.

The communicator 302 exchanges information by communicating with the user terminal T or the communication device 50 provided in the electric vehicle 10 via the network NW. The communicator 302 receives information about the use request for the removable battery 400 transmitted by the user terminal T through communication via the network NW. The communicator 302 outputs the received information about the use request for the removable battery 400 to the dedicated code generator 304.

The dedicated code generator 304 creates dedicated code information (hereinafter referred to as a dedicated code) for using the removable battery 400 on the basis of information about the use request for the removable battery 400 output by the communicator 302. The dedicated code is an authentication code such as a password for authenticating permission to use the removable battery 400. The dedicated code includes, for example, a predetermined number of characters or symbols capable of being read by the user U. For example, when the HMI 60 provided in the electric vehicle 10 is configured to include an imaging device such as a camera, the dedicated code may have a format of a one-dimensional barcode or a two-dimensional barcode (a so-called QR code (registered trademark)) instead of a character or symbol capable of being read from an image captured by the imaging device. The dedicated code generator 304 outputs the created dedicated code (hereinafter referred to as a user-dedicated code) to the communicator 302.

The communicator 302 transmits the user-dedicated code output by the dedicated code generator 304 to the user terminal T through communication via the network NW. Thereby, a notification of the user-dedicated code created by the dedicated code generator 304 is provided to the user U by the battery use application. The user-dedicated code whose notification is provided to the user U is an example of a "second dedicated code" in the claims.

If the communicator 302 receives a request for the dedicated code from the removable battery 400 transmitted via the network NW by the communication device 50 provided in the electric vehicle 10 when the removable battery 400 is actually used, the received request for the dedicated code is output to the dedicated code generator 304.

The communicator 302 transmits the dedicated code output by the dedicated code generator 304 in response to the request for the dedicated code to the communication device 50 provided in the electric vehicle 10 through communication via the network NW. In other words, the communicator 302 transmits the dedicated code (hereinafter referred to as a battery-dedicated code) output by the dedicated code generator 304 in response to the request for the dedicated code to the removable battery 400. Thereby, the removable battery 400 supplies electric power stored in the secondary battery to the VCU 34 provided in the electric vehicle 10 only during a time period in which the supply of the electric power stored in the secondary battery to the electric vehicle 10 is permitted stored in the time period storage of the removable battery 400 to be described below.

The battery-dedicated code transmitted by the communicator 302 to the removable battery 400 may include information about the use start time and the use end time requested by the user U. In other words, the battery-dedicated code may include information about a time period in which the supply of the electric power stored in the secondary battery to the electric vehicle 10 in which the removable battery 400 is mounted is permitted. In this case, the removable battery 400 can supply the electric power stored in the secondary battery to the VCU 34 provided in the electric vehicle 10 only during a time period from the use start time to the use end time in place of or in addition to the time period stored in the time period storage of the removable battery 400 to be described below. The battery-dedicated code transmitted by the communicator 302 to the removable battery 400 is an example of a "first dedicated code" in the claims.

[Configuration of Removable Battery]

Figure 3:
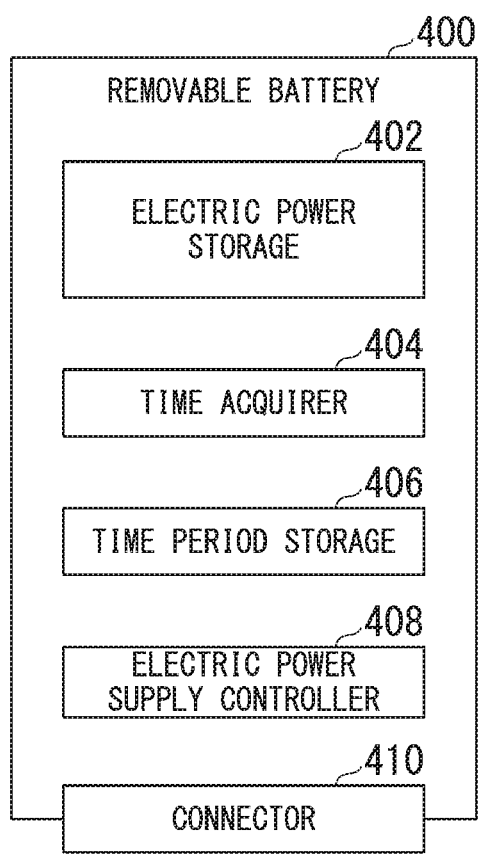
FIG. 3 is a block diagram showing a schematic configuration of the vehicular removable battery.

Next, an example of the removable battery 400 mounted in the electric vehicle 10 and constituting the antitheft system 200 will be described. FIG. 3 is a block diagram showing a schematic configuration of the vehicular removable battery 400. The removable battery 400 shown in FIG. 3 includes an electric power storage 402, a time acquirer 404, a time period storage 406, an electric power supply controller 408, and a connector 410.

The electric power storage 402 is the above-described secondary battery. The connector 410 is a connection port including an electric power port and a communication port. The electric power port supplies the electric power stored in the electric power storage 402 to the VCU 34 provided in the electric vehicle 10 when the removable battery 400 is mounted in the electric vehicle 10. The communication port exchanges information for controlling the antitheft function of the removable battery 400 with the controller 36 provided in the electric vehicle 10 when the removable battery 400 is mounted in the electric vehicle 10.

The time acquirer 404 acquires a current time from the controller 36 via the communication port of the connector 410. The time acquirer 404 may have a clock function of measuring the current time on its own. In this case, the time acquirer 404 can treat the measured current time as being acquired from the controller 36. If the time acquirer 404 has a clock function of measuring the current time on its own, the time acquirer 404 may acquire the current time in the electric vehicle 10 from the controller 36 or correct the current time measured on its own on the basis of the acquired current time in the electric vehicle 10 when the removable battery 400 is mounted in the electric vehicle 10.

The time period storage 406 stores information about a time period in which the supply of the electric power stored in the electric power storage 402 to the electric vehicle 10 is permitted. The time period storage 406 is implemented by, for example, a flash memory, an electrically erasable programmable read only memory (EEPROM), or the like. Information of the time when the permission of supply of the electric power to the electric power storage 402 starts (hereinafter referred to as an electric power supply permission start time) and the time when the permission of supply of the electric power to the electric power storage 402 ends (hereinafter referred to as an electric power supply permission end time) is included in the time period stored by the time period storage 406.

The electric power supply controller 408 controls the supply of the electric power stored in the electric power storage 402 to the electric vehicle 10. The electric power supply controller 408 includes, for example, a hardware processor such as a CPU and a storage device storing a program (software) (a storage device including a non-transitory storage medium) and a function thereof is implemented when the processor executes the program. A function of the electric power supply controller 408 may be implemented by hardware such as an LSI, an ASIC, an FPGA, or a GPU (a circuit unit including circuitry) or may be implemented by software and hardware in cooperation. The function of the electric power supply controller 408 may be implemented by a dedicated LSI. Here, the program (software) may be pre-stored in a storage device (a storage device including a non-transitory storage medium) such as a ROM, a RAM, or a flash memory. The electric power supply controller 408 may be implemented as a function of a part of a battery management unit (BMU) (not shown) for controlling the charging and discharging of the electric power storage 402 provided in the removable battery 400.

For example, when the user U issues an activation instruction in a state in which an ignition key (not shown) provided in the electric vehicle 10 is turned on or the like with respect to the electric vehicle 10 in which the removable battery 400 is mounted, the electric power supply controller 408 executes control in an antitheft function of the removable battery 400 before electric power stored in the electric power storage 402 is supplied to the electric vehicle 10. In the control of the antitheft function executed by the electric power supply controller 408, whether the supply of the electric power stored in the electric power storage 402 to the electric vehicle 10 is to be enabled or prohibited is controlled. In other words, the electric power supply controller 408 switches between whether the supply of the electric power stored in the electric power storage 402 to the electric vehicle 10 is to be turned on or off. For example, an electromagnetic contactor (a contactor) is conceivable as a component for performing switching between whether the supply of the electric power stored in the electric power storage 402 to the electric vehicle 10 is to be turned on or off. In this case, the electric power supply controller 408 controls whether the supply of the electric power stored in the electric power storage 402 to the electric vehicle 10 is to be enabled or prohibited by outputting a control signal for controlling contact of the electric power port of the connector 410 and the electric power output port of the electric power storage 402 connected to the electromagnetic contactor. An initial state in the control of the antitheft function of the electric power supply controller 408 is a state in which the supply of the electric power stored in the electric power storage 402 to the electric vehicle 10 is prohibited. Thereby, if the removable battery 400 has been stolen, the removable battery 400 does not supply the electric power stored in the electric power storage 402 and cannot be used.

A configuration in which the electric power supply controller 408 switches between whether the supply of the electric power stored in the electric power storage 402 to the electric vehicle 10 is to be turned on or off is not limited to the above-described configuration. For example, an electronic component such as a transistor may be configured such that the electric power supply controller 408 switches between whether the supply of the electric power stored in the electric power storage 402 to the electric vehicle 10 is to be turned on or off.

[Flow of Overall Procedure]

Figure 4:
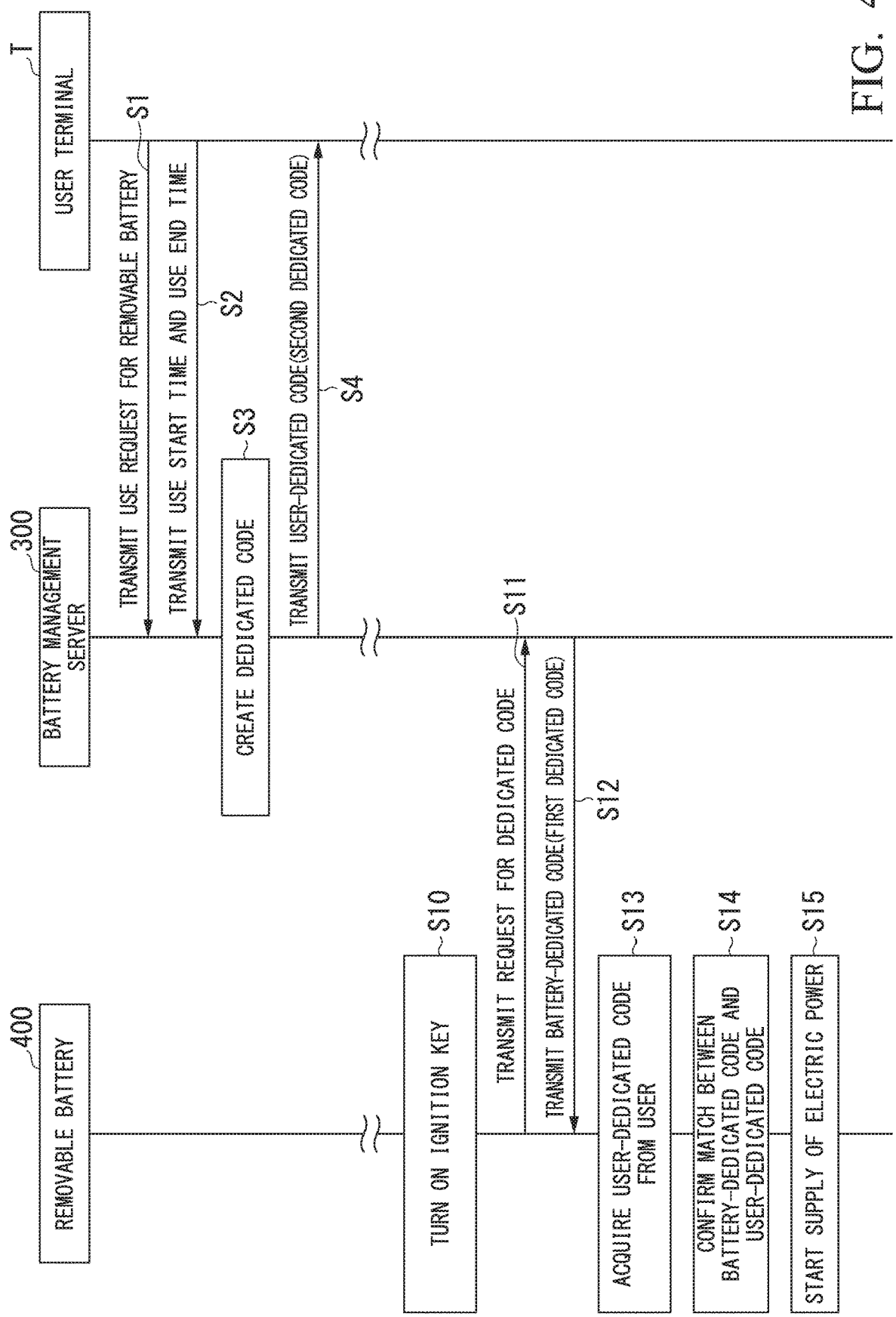
FIG. 4 is a sequence diagram showing an example of an overall flow of a procedure in the antitheft system.

Next, an example of an overall flow of a procedure of preventing the theft of the removable battery 400 in the antitheft system 200 will be described. FIG. 4 is a sequence diagram showing an example of the overall flow of the procedure in the antitheft system 200. In FIG. 4, an example of processing between the removable battery 400, the battery management server 300, and the user terminal T that cooperate in the antitheft system 200 is shown. It is assumed that the user terminal T is executing the battery use application. Although the removable battery 400 exchanges information for controlling the antitheft function of the removable battery 400 via the controller 36, the communication device 50, and the HMI 60 provided in the electric vehicle 10 as described above, it is assumed that the removable battery 400 directly exchanges information for controlling the antitheft function for ease of description.

In an example of the process of the antitheft system 200 shown in FIG. 4, the user U first operates the user terminal T (the battery use application) to transmit a use request for the removable battery 400 to the battery management server 300. At this time, the user U inputs a use start time and a use end time to the user terminal T. Thereby, the user terminal T transmits the use request to the battery management server 300 via the network NW (step S1). At this time, the user terminal T includes identification information for associating the user U, the electric vehicle 10, and the removable battery 400 such as identification information for identifying the user U (hereinafter referred to as a user ID), identification information for identifying the electric vehicle 10 owned by the user U (hereinafter referred to as a vehicle ID), and identification information for identifying the removable battery 400 (hereinafter referred to as a battery ID) in the use request and transmits the use request to the battery management server 300. The user ID, the vehicle ID, and the battery ID are identification information registered in advance in the battery use application. The user terminal T transmits the use start time and the use end time input by the user U to the battery management server 300 via the network NW (step S2).

If the use request transmitted by the user terminal T is received, the battery management server 300 performs the collation of the user ID, the vehicle ID, the battery ID, or the like included in the use request and determines whether or not the user U who has transmitted the use request is a correct user who owns the electric vehicle 10 or the removable battery 400. When it is determined that the user U is a correct user, the battery management server 300 creates a dedicated code on the basis of the use start time and the use end time transmitted by the user terminal T (step S3). The battery management server 300 transmits the created dedicated code (the user-dedicated code) to the user terminal T that has transmitted the use request, the use start time, and the use end time (step S4).

Subsequently, when the user U gets into the electric vehicle 10 and gives an instruction to start the electric vehicle 10 by, for example, turning on the ignition key (step S10), the removable battery 400 transmits a request for a dedicated code to the battery management server 300 via the network NW (step S11). The battery management server 300 transmits a created dedicated code (battery-dedicated code) to the removable battery 400 in response to the request from the removable battery 400 (step S12).

When the removable battery 400 receives the battery-dedicated code transmitted by the battery management server 300, the removable battery 400 acquires the user-dedicated code from the user U (step S13). As a method in which the removable battery 400 acquires the user-dedicated code from the user U, for example, a method of causing the display device of the HMI 60 to perform a display operation of prompting the user to input the user-dedicated code and a method of acquiring the user-dedicated code input to the input device of the HMI 60 by the user U are conceivable. However, the method in which the removable battery 400 acquires the user-dedicated code from the user U is not limited to this method. For example, when the HMI 60 may be configured to include an imaging device such as a camera as an input device, the user-dedicated code may be displayed on the display unit of the user terminal T and the display device of the HMI 60 may be allowed to perform a display operation for prompting the user to hold the display unit over the camera, so that the user-dedicated code read or recognized from the image captured by the camera may be acquired. For example, when a short-range wireless communication module such as Wi-Fi (registered trademark) or Bluetooth (registered trademark) is provided in the removable battery 400, the user-dedicated code stored in the user terminal T may be acquired by performing wireless communication with the battery use application executed by the user terminal T.

Subsequently, the removable battery 400 confirms whether or not the battery-dedicated code transmitted by the battery management server 300 matches the user-dedicated code input by the user U (step S14). When the battery-dedicated code matches the user-dedicated code, the removable battery 400 starts the supply of electric power to the electric vehicle 10 (step S15). When the battery-dedicated code does not match the user-dedicated code, the removable battery 400 stops the supply of electric power to the electric vehicle 10. In this case, for example, the removable battery 400 may cause a message representing that the supply of electric power is stopped because the dedicated codes do not match to be displayed on the display device of the HMI 60.

According to a flow of the above-described processing procedure, in the antitheft system 200, the removable battery 400, the battery management server 300, and the user terminal T cooperate with each other to control the antitheft function of the removable battery 400. The removable battery 400 supplies electric power stored in the electric power storage 402 to the electric vehicle 10 only during the time period stored in the time period storage 406.

[Control of Supply of Electric Power in Removable Battery 400]

Figure 5:
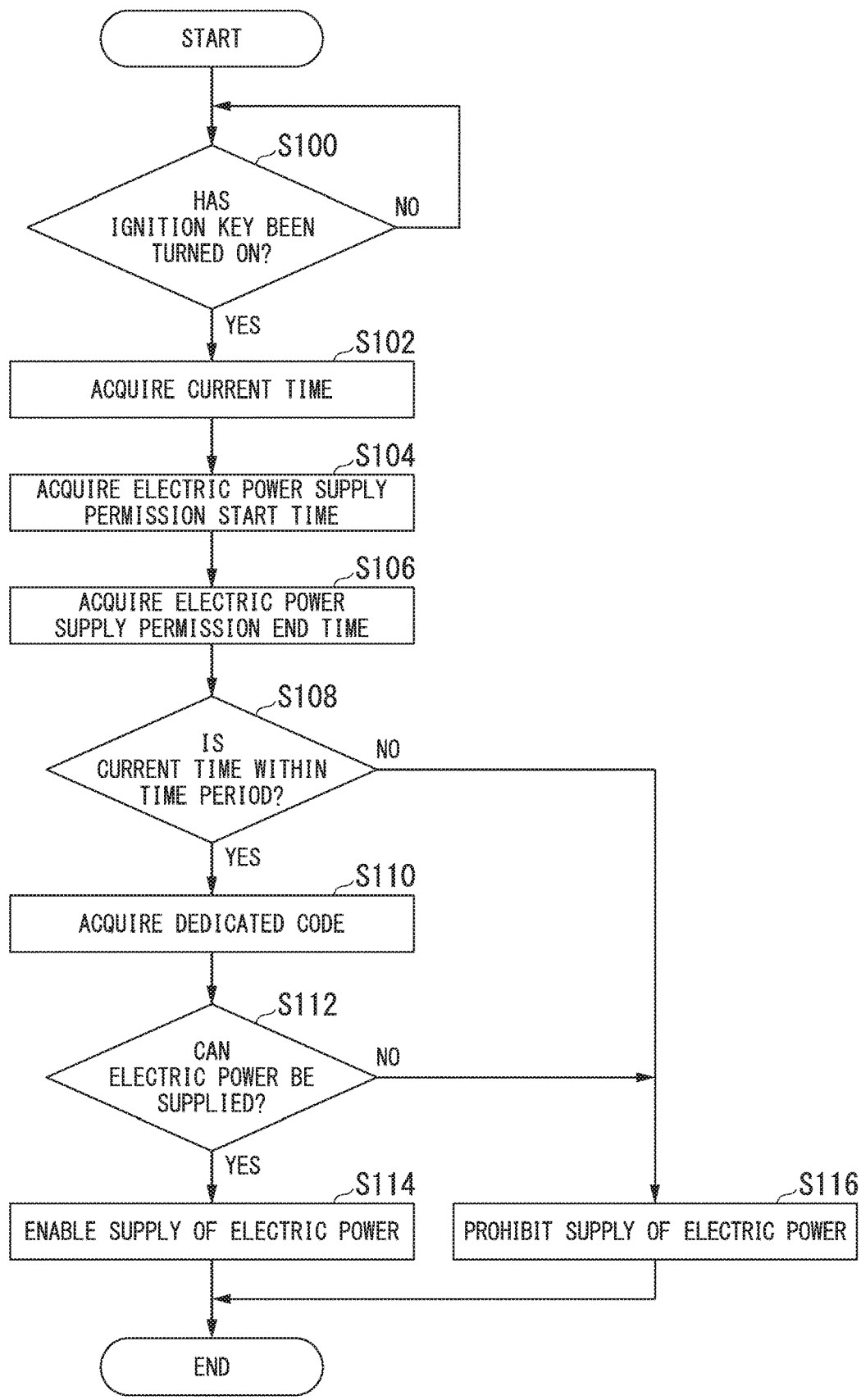
FIG. 5 is a flowchart showing an example of a flow of a process to be executed by the vehicular removable battery when an activation instruction of the electric vehicle has been issued.

Next, an example of a more detailed flow of a process of the removable battery 400 that constitutes the antitheft system 200 will be described. FIG. 5 is a flowchart showing an example of a flow of a process to be executed by the vehicular removable battery 400 when an activation instruction of the electric vehicle 10 has been issued. In FIG. 5, an example of the process to be executed by the removable battery 400 in a state in which the removable battery 400 is mounted in the electric vehicle 10 is shown. In the following description, it is assumed that the time period storage 406 provided in the removable battery 400 stores an electric power supply permission start time and an electric power supply permission end time.

When the removable battery 400 is mounted in the electric vehicle 10, the electric power supply controller 408 of the removable battery 400 determines whether or not the user U has turned on the ignition key (an activation instruction for the electric vehicle 10 has been issued) (step S100). When it is determined that the ignition key has not been turned on in step S100, the electric power supply controller 408 iterates step S100 and waits for the ignition key to be turned on.

On the other hand, when it is determined that the ignition key has been turned on in step S100, the electric power supply controller 408 causes the time acquirer 404 to acquire a current time from the electric vehicle 10 (step S102). The time acquirer 404 outputs the acquired current time to the electric power supply controller 408.

Next, the electric power supply controller 408 acquires the electric power supply permission start time stored in the time period storage 406 (step S104). Subsequently, the electric power supply controller 408 acquires the electric power supply permission end time stored in the time period storage 406 (step S106).

Next, the electric power supply controller 408 determines whether or not the acquired current time is within a time period from the acquired electric power supply permission start time to the electric power supply permission end time (step S108).

When it is determined that the current time is within the time period in step S108, the electric power supply controller 408 acquires a battery-dedicated code from the battery management server 300 connected to the network NW via the controller 36 and the communication device 50 provided in the electric vehicle 10. The electric power supply controller 408 acquires a user-dedicated code input by the user U via the controller 36 and the HMI 60 provided in the electric vehicle 10 (step S110).

Next, the electric power supply controller 408 confirms whether or not the battery-dedicated code acquired from the battery management server 300 matches the user-dedicated code input by the user U and determines whether or not the supply of electric power stored in the electric power storage 402 to the electric vehicle 10 is possible (step S112).

When it is determined that the supply of electric power stored in the electric power storage 402 to the electric vehicle 10 is possible in step S112, the electric power supply controller 408 enables the supply of the electric power stored in the electric power storage 402 to the electric vehicle 10 (step S114). At this time, for example, the electric power supply controller 408 outputs a control signal for causing the electric power port of the connector 410 and the electric power output port of the electric power storage 402 to be in contact with the electromagnetic contactor (the contactor). Thereby, the electric power stored in the electric power storage 402 is supplied to the VCU 34 provided in the electric vehicle 10 and the electric vehicle 10 can start traveling in accordance with an operation by the user U. The electric power supply controller 408 ends the process of the present flowchart.

On the other hand, when it is determined that the current time is not within the time period in step S108 or when it is determined that the supply of the electric power stored in the electric power storage 402 to the electric vehicle 10 is not possible in step S112, the electric power supply controller 408 prohibits the supply of electric power stored in the electric power storage 402 to the electric vehicle 10 (step S116). At this time, for example, the electric power supply controller 408 outputs a control signal for preventing the electric power port of the connector 410 and the electric power output port of the electric power storage 402 from being in contact with the electromagnetic contactor (the contactor). Thereby, the electric power stored in the electric power storage 402 is not supplied to the VCU 34 provided in the electric vehicle 10. In other words, the removable battery 400 cannot be used and the electric vehicle 10 cannot start traveling. The electric power supply controller 408 ends the process of the present flowchart.

According to such a process flow, when the battery-dedicated code matches the user-dedicated code, the electric power supply controller 408 supplies the electric power stored in the electric power storage 402 to the electric vehicle 10 only during a time period from the electric power supply permission start time to the electric power supply permission end time stored (set) in the time period storage 406. When the battery-dedicated code does not match the user-dedicated code, the electric power supply controller 408 prohibits the supply of the electric power stored in the electric power storage 402 to the electric vehicle 10. In this case, even if the removable battery 400 has been stolen, the removable battery 400 cannot be used. Thereby, it is possible to prevent the theft of the removable battery 400 or prevent (curb) the execution of the theft of the removable battery 400.

As described above, the battery-dedicated code may include information about the use start time and the use end time requested by the user U. In this case, as described above, the removable battery 400 can supply the electric power stored in the electric power storage 402 to the electric vehicle 10 only during a time period from the use start time to the use end time in place of or in addition to the time period stored in the time period storage 406. The process of the electric power supply controller 408 in this case can be easily understood in consideration of a manner similar to that of the process of the electric power supply controller 408 in the control of the supply of electric power in the removable battery 400 shown in FIG. 5. For example, after the battery-dedicated code is acquired from the battery management server 300 in step S110, it is possible to supply electric power stored in the electric power storage 402 to the electric vehicle 10 only during the time period from the use start time to the use end time by using the use start time instead of the electric power supply permission start time, using the use end time instead of the electric power supply permission end time, and performing the processing of step S108. Accordingly, a detailed description of the process of the electric power supply controller 408 in this case will be omitted.

A case in which the removable battery 400 performs the updating of the time period (the electric power supply permission start time and the electric power supply permission end time) stored in the time period storage 406 (including addition thereof) by learning the current traveling of the electric vehicle 10 is conceivable. A case in which the removable battery 400 performs the updating of the time period (the electric power supply permission start time and the electric power supply permission end time) stored in the time period storage 406 to a time period input by the user U (including addition thereof) is also conceivable.

[Time Period Update Control for Removable Battery 400]

Figure 6:
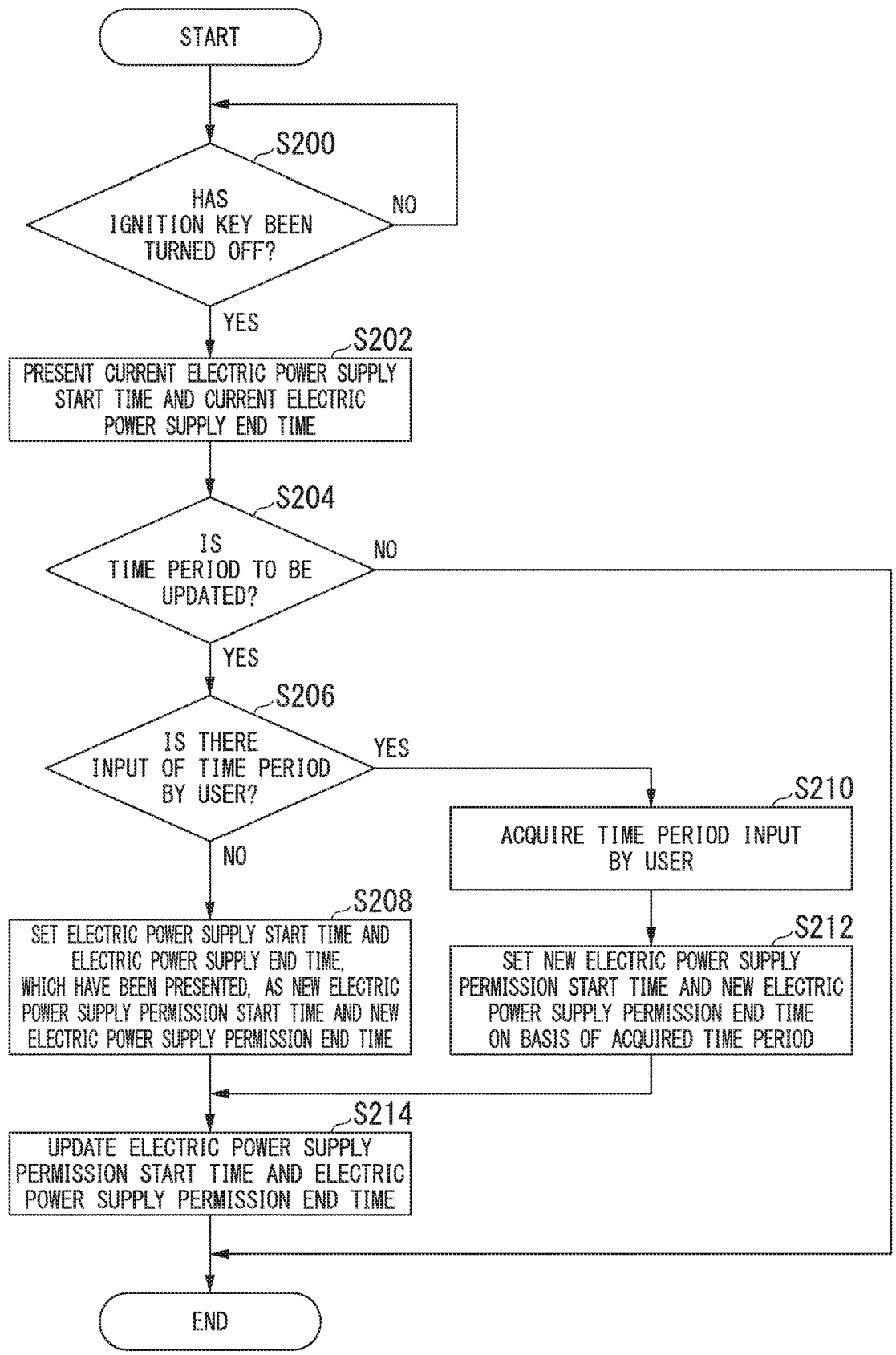
FIG. 6 is a flowchart showing an example of a flow of a process to be executed by the vehicular removable battery when an operation end instruction of the electric vehicle has been issued.

Next, a process of updating the time period in which electric power is supplied in the removable battery 400 that constitutes the antitheft system 200 will be described. FIG. 6 is a flowchart showing an example of a flow of a process to be executed by the vehicular removable battery 400 when an operation end instruction of the electric vehicle 10 has been issued. In FIG. 6, an example of a process in which the removable battery 400 updates the time period stored in the time period storage 406 when the traveling of the electric vehicle 10 is completed in a state in which the removable battery 400 has been mounted in the electric vehicle 10 is shown.

In the following description, it is assumed that the time period in which the removable battery 400 is updated has already been learned during the current traveling of the electric vehicle 10. Here, the time period learned by the removable battery 400 includes information of an electric power supply start time at which the current traveling of the electric vehicle 10 started and an electric power supply end time at which the current traveling of the electric vehicle 10 ended. The electric power supply start time is the time corresponding to the electric power supply permission start time and the electric power supply end time is the time corresponding to the electric power supply permission end time.

In the state in which the removable battery 400 has been mounted in the electric vehicle 10, the electric power supply controller 408 of the removable battery 400 determines whether or not the user U has turned off the ignition key (an operation end instruction of the electric vehicle 10 has been issued) (step S200). When it is determined that the ignition key has not been turned off in step S200, the electric power supply controller 408 iterates step S200 and waits for the ignition key to be turned off.

On the other hand, when it is determined that the ignition key has been turned off in step S200, the electric power supply controller 408 presents the electric power supply start time and the electric power supply end time obtained by learning the current traveling of the electric vehicle 10 to the user U (step S202). At this time, for example, the electric power supply controller 408 causes the display device of the HMI 60 to display the electric power supply start time and the electric power supply end time.

Next, the electric power supply controller 408 confirms whether or not the time period stored in the time period storage 406 is to be updated (step S204). Here, as a method in which the electric power supply controller 408 confirms whether or not the time period stored in the time period storage 406 is to be updated, for example, a method of causing the display device of the HMI 60 to perform a display operation for prompting the user U to input an instruction of whether or not the time period is to be updated and acquiring an instruction input by the user U to the input device of the HMI 60 is conceivable. When it is confirmed that the time period stored in the time period storage 406 is not to be updated in step S204, the electric power supply controller 408 ends the process of the present flowchart.

On the other hand, when it is confirmed that the time period stored in the time period storage 406 is to be updated in step S204, the electric power supply controller 408 confirms whether or not the user U has input a time period (step S206). Here, as a method in which the electric power supply controller 408 confirms whether or not the user U has input a time period, for example, a method of causing the display device of the HMI 60 to perform a display operation for prompting the user U to input a time period and confirming whether or not the user U has input a time period according to whether or not the user U has performed an operation of inputting a time period to the input device of the HMI 60 is conceivable.

When it is confirmed that the user U has not input a time period in step S206, the electric power supply controller 408 sets the electric power supply start time and the electric power supply end time, which have been presented, as a new electric power supply permission start time and a new electric power supply permission end time for updating (step S208).

On the other hand, when it is confirmed that the user U has input a time period in step S206, the electric power supply controller 408 acquires the time period input by the user U (step S210). Here, as a method in which the electric power supply controller 408 acquires the time period input by the user U, for example, a method of acquiring the time period input by the user U to the input device of the HMI 60 is conceivable.

Next, the electric power supply controller 408 sets a new electric power supply permission start time and a new electric power supply permission end time for updating on the basis of the acquired time period (step S212). At this time, for example, the electric power supply controller 408 sets the electric power supply start time input by the user U to the input device of the HMI 60 as the new electric power supply permission start time and sets the electric power supply end time input by the user U to the input device of the HMI 60 as the new electric power supply permission end time.

Next, the electric power supply controller 408 updates each of the new electric power supply permission start time and the new electric power supply permission end time set in step S208 or S212 (step S214). At this time, the electric power supply controller 408 may output each of the new electric power supply permission start time and the new electric power supply permission end time to the time period storage 406 and rewrite each of a current electric power supply permission start time and a current electric power supply permission end time stored by the time period storage 406 or may additionally store the new electric power supply permission start time and the new electric power supply permission end time in addition to the current electric power supply permission start time and the current electric power supply permission end time. The electric power supply controller 408 ends the process of the present flowchart.

After each of the new electric power supply permission start time and the new electric power supply permission end time is updated, the electric power supply controller 408 may be configured to create the user-dedicated code on the basis of the updated electric power supply permission start time and the updated electric power supply permission end time and present the user-dedicated code to the user U, for example, by causing the display device of the HMI 60 to display the user-dedicated code.

According to such a process flow, the electric power supply controller 408 updates the time period stored in the time period storage 406 to a time period obtained by learning the current traveling of the electric vehicle 10 or a time period input by the user U. Thereby, the removable battery 400 can perform learning such that the time period in which the electric power stored in the electric power storage 402 is supplied to the electric vehicle 10 matches the time period in which the user U uses the electric vehicle 10. In other words, the removable battery 400 can adjust the time period to be used to a rhythm of the life of the user U.

As described above, for example, the removable battery 400 includes a short-range wireless communication module such as Wi-Fi (registered trademark) or Bluetooth (registered trademark) and may be configured to perform wireless communication with a battery use application executed by the user terminal T. In this case, the removable battery 400 may perform the updating of a time period stored in the time period storage 406 (including addition thereof) by directly performing wireless communication with the user terminal T. The process of the electric power supply controller 408 in this case can be easily understood in consideration of a manner similar to that of the process shown in FIG. 6 because the display on the user terminal T and the acquisition from the user terminal T are performed with respect to the display on the display device of the HMI 60 and the instruction input to the input device of the HMI 60 in the time period update control process of the removable battery 400 shown in FIG. 6. Accordingly, a detailed description of the process of the electric power supply controller 408 in this case will be omitted.

[Learning of Time Period in Removable Battery 400]

Figure 7:
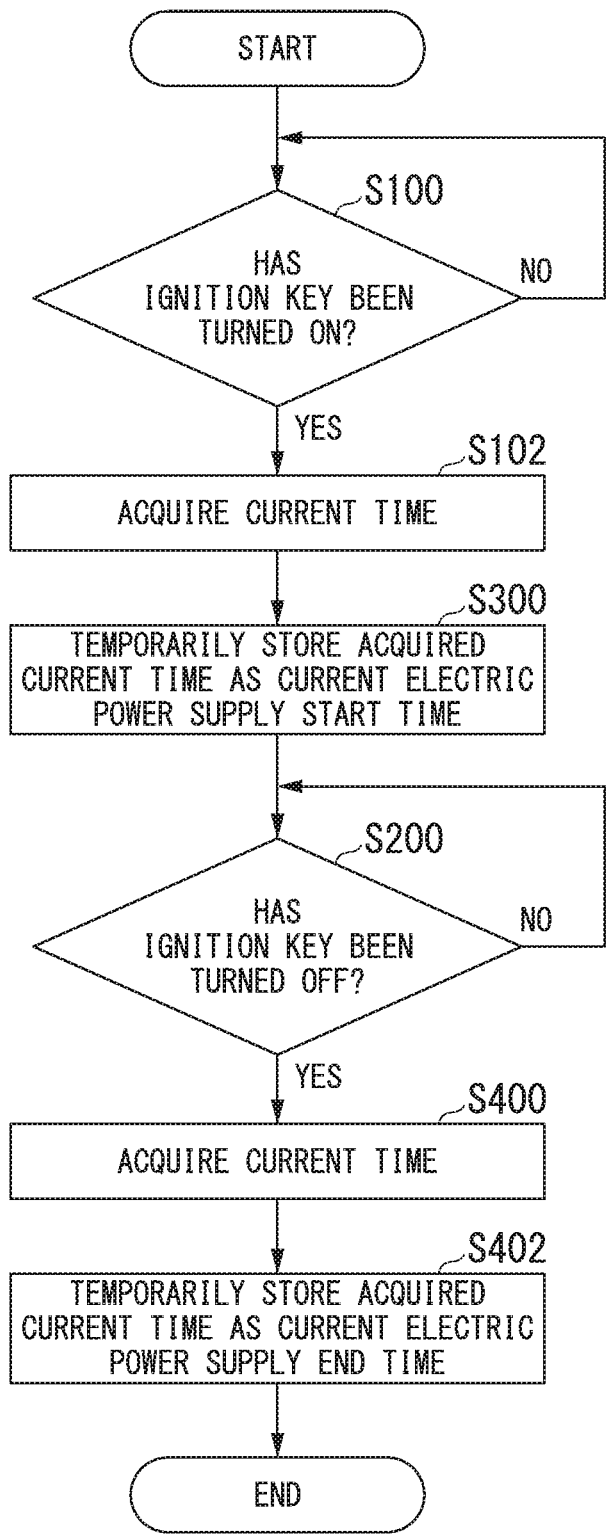
FIG. 7 is a flowchart showing an example of a flow of a process to be executed when a time period to be updated in the vehicular removable battery is learned.

Although the description has been given under the assumption that the time period to be updated is already learned in the time period update control process of the removable battery 400 shown in FIG. 6, an example of a process of learning a time period to be updated in the removable battery 400 will be described below. FIG. 7 is a flowchart showing an example of a flow of a process to be executed when the time period to be updated is learned in the vehicular removable battery 400. In FIG. 7, an example of a process of learning the time period to be updated in one traveling operation of the electric vehicle 10 is shown.

The process of learning the time period in the removable battery 400 shown in FIG. 7 is performed in parallel with a process of a part of the electric power supply control process in the removable battery 400 shown in FIG. 5 or the time period update control process in the removable battery 400 shown in FIG. 6. Thus, the process of the flowchart shown in FIG. 7 includes a process similar to that of the flowchart shown in FIG. 5 or 6. Accordingly, in the following description, the same step numbers are given to processing steps similar to those of the flowchart shown in FIG. 5 or 6, a detailed description thereof will be omitted, and a process different from that of the flowchart shown in FIG. 5 or 6 will be described.

When it is determined that the ignition key has been turned on in step S100 in a state in which the removable battery 400 is mounted in the electric vehicle 10 and the time acquirer 404 acquires and outputs a current time in step S102, the electric power supply controller 408 temporarily stores the current time output by the time acquirer 404 as an electric power supply start time in current traveling (step S300). The electric power supply controller 408 may temporarily store the electric power supply start time in current traveling in a storage area different from a storage area of the time period storage 406 provided in the removable battery 400 divided into storage areas for storing an electric power supply permission start time and an electric power supply permission end time or may temporarily store the electric power supply start time in current traveling in an EEPROM different from the time period storage 406.

Subsequently, when it is determined that the ignition key has been turned off in step S200, the electric power supply controller 408 causes the time acquirer 404 to acquire a current time from the electric vehicle 10 (step S400). The time acquirer 404 outputs the acquired current time to the electric power supply controller 408.

Next, the electric power supply controller 408 temporarily stores the current time output by the time acquirer 404 as an electric power supply end time in the current traveling (step S402). As in the storage of the electric power supply start time in the current traveling, the electric power supply controller 408 may also temporarily store the electric power supply end time in the current traveling in a storage area different from the storage area of the time period storage 406 provided in the removable battery 400 divided into the storage areas for storing the electric power supply permission start time and the electric power supply permission end time or may temporarily store the electric power supply end time in the current traveling in an EEPROM different from the time period storage 406.

According to such a process flow, the electric power supply controller 408 learns the time period to be updated by temporarily storing the electric power supply start time in the current traveling and the electric power supply end time in the current traveling. Subsequently, the electric power supply controller 408 presents the learned electric power supply start time and the learned electric power supply end time to the user U in the time period update control process in the removable battery 400 shown in FIG. 6 and performs updating of the learned electric power supply start time and the learned electric power supply end time as a new electric power supply permission start time and a new electric power supply permission end time (also including addition thereof) in accordance with an instruction from the user.

In the time period learning process of the removable battery 400 shown in FIG. 7, a case in which the current traveling of the electric vehicle 10 is learned has been described. However, a case in which traveling of the electric vehicle 10 may be performed a plurality of times on the same day, i.e., the removable battery 400 may be used a plurality of times, is also conceivable. In this case, the electric power supply controller 408 may learn a plurality of traveling operations of the electric vehicle 10 on the same day as one traveling operation and learn a time period from the first electric power supply start time to the last electric power supply end time on that day as an update time period. Because the process of the electric power supply controller 408 in this case can be easily understood in consideration of a manner similar to that of the process shown in FIG. 7, a detailed description thereof will be omitted.

In the above description, a case in which the learned time period for each traveling operation of the electric vehicle 10 is updated has been described. However, a cycle in which the removable battery 400 updates the learned time period is not limited to each traveling operation of the electric vehicle 10. In this case, for example, the electric power supply controller 408 may also be configured to perform learning including the traveling of the electric vehicle 10 within a previous predetermined period such as one week or one month, i.e., the previous use of the removable battery 400, and perform a time period update control process of the removable battery 400 shown in FIG. 6 at a predetermined timing. Because the process of the electric power supply controller 408 in this case can be easily understood in consideration of a manner similar to that of the process shown in FIG. 6, a detailed description thereof will be omitted.

As described above, according to the removable battery 400 of the embodiment, when the battery-dedicated code transmitted by the battery management server 300 matches the user-dedicated code input by the user U, electric power stored in the electric power storage 402 is supplied to the electric vehicle 10 only during a time period from the electric power supply permission start time to the electric power supply permission end time stored (set) in the time period storage 406. In other words, in the removable battery 400 of the embodiment, the supply of electric power stored in the electric power storage 402 to the electric vehicle 10 is prohibited when the battery-dedicated code does not match the user-dedicated code and other than during the time period stored (set) in the time period storage 406. According to the antitheft system 200 of the embodiment, the user U operates the user terminal T to set a time period in which the supply of electric power to the electric vehicle 10 has been requested in the removable battery 400, so that the electric power is supplied from the removable battery 400 to the electric vehicle 10 only during the set time period and the electric power is not supplied from the removable battery 400 to the electric vehicle 10 except for during the set time period. Thereby, in the antitheft system 200 of the embodiment and the removable battery 400 of the embodiment, it is possible to prevent the theft of the removable battery 400 or prevent (curb) the execution of the theft of the removable battery 400 and reduce the possibility of the theft of the removable battery 400.

Moreover, the removable battery 400 of the embodiment can learn the electric power supply start time and the electric power supply end time and perform updating of the electric power supply permission start time and the electric power supply permission end time in the time period storage 406 (also including addition thereof). Thereby, the removable battery 400 can perform learning so that the time period to be used may be adjusted to the time period in which the user U uses the electric vehicle 10 (a rhythm of the life of the user U).

According to the above-described embodiment, a vehicular removable battery removably mountable in an electric vehicle includes the time acquirer 404 configured to acquire a current time; the time period storage 406 storing a time period in which electric power is supplied; and the electric power supply controller 408 configured to control the supply of the electric power stored in the electric power storage 402 to the electric vehicle 10, wherein, after the electric power supply controller detects that an activation instruction of the electric vehicle has been issued, the electric power supply controller 408 enables the supply of the stored electric power to the electric vehicle 10 in a case where the acquired current time is included in the stored time period, and the electric power supply controller 408 prohibits the supply of the electric power to the electric vehicle 10 in a case where the acquired current time is not included in the stored time period, so that anyone other than the user U cannot use the removable battery 400. Thereby, it is possible to prevent the theft of the removable battery 400 or prevent (curb) the execution of the theft of the removable battery 400 and reduce the possibility of the theft of the removable battery 400.

Although modes for carrying out the present invention have been described using embodiments, the present invention is not limited to the embodiments and various modifications and substitutions can also be made without departing from the scope and spirit of the present invention.

What is claimed is:

1. An antitheft system for a vehicular removable battery, the antitheft system comprising:
   the vehicular removable battery removably mountable in an electric vehicle;
   a battery management server configured to manage the use of the vehicular removable battery in the electric vehicle,
   wherein the vehicular removable battery comprises:
   a time acquirer configured to acquire a current time;
   a time period storage storing a time period in which electric power is supplied; and
   an electric power supply controller configured to control the supply of the electric power stored in an electric power storage to the electric vehicle,
   wherein, in response to the electric power supply controller detecting that an activation instruction of the electric vehicle has been issued, the electric power supply controller is configured to enable the supply of the stored electric power to the electric vehicle in response to the acquired current time is included in the stored time period, and the electric power supply controller is configured to prohibit the supply of the electric power to the electric vehicle in response to the acquired current time is not included in the stored time period,
   wherein the battery management server is configured to create a dedicated code for using the vehicular removable battery in the electric vehicle on the basis of a use request, a use start time, and a use end time of the vehicular removable battery transmitted by a terminal device of a user of the electric vehicle and transmit the created dedicated code as a second dedicated code to the terminal device,
   wherein the battery management server is configured to transmit the created dedicated code as a first dedicated code to the vehicular removable battery in response to a request from the vehicular removable battery mounted in the electric vehicle, and
   wherein the vehicular removable battery is configured to enable the supply of the electric power stored in the electric power storage to the electric vehicle in response to the first dedicated code transmitted by the battery management server matches a code input from an input device by the user and prohibit the supply of the electric power to the electric vehicle in response to the first dedicated code does not match the input code.

2. The antitheft system according to claim 1, wherein, in response to detecting that the activation instruction of the electric vehicle has been issued, the electric power supply controller is configured to acquire a first dedicated code transmitted by the battery management server, acquire a second dedicated code input by a user of the electric vehicle from an input device, and enable the supply of the electric power to the electric vehicle in response to the acquired first dedicated code matches the acquired second dedicated code.

3. The antitheft system according to claim 2, wherein the electric power supply controller is configured to acquire the first dedicated code via a communication device provided in the electric vehicle.

4. The antitheft system according to claim 2, wherein the electric power supply controller is configured to update the time period stored in the time period storage by setting a new time period from an electric power supply start time to an electric power supply end time acquired on the basis of an operation state of the electric vehicle as the new time period.

5. The antitheft system according to claim 4, wherein the electric power supply start time is the acquired current time in response to detecting that the activation instruction of the electric vehicle has been issued, and wherein the electric power supply end time is the acquired current time in response to detecting that an operation end instruction of the electric vehicle has been issued.

6. The antitheft system according to claim 2, wherein the input device is a device mounted in the electric vehicle, and wherein the electric power supply controller is configured to update the time period stored in the time period storage by setting a time period input by the user of the electric vehicle as a new time period.

* * * * *